United States Patent [19]

Duckett

[11] 4,060,155

[45] Nov. 29, 1977

[54] HYDRAULIC SHOCK ABSORBER

[75] Inventor: William Arthur Duckett, Ossett, England

[73] Assignee: Jonas Woodhead Limited, England

[21] Appl. No.: 623,989

[22] Filed: Oct. 20, 1975

[30] Foreign Application Priority Data

Oct. 23, 1974 United Kingdom .............. 45779/74

[51] Int. Cl.² .............................................. F16F 9/50
[52] U.S. Cl. ................................. 188/282; 137/493.1; 188/317
[58] Field of Search .............. 188/282, 317, 322, 288; 137/493.1, 493.6

[56] References Cited

U.S. PATENT DOCUMENTS

| 2,546,051 | 2/1951 | Whisler, Jr. .................. 188/317 X |
| 3,043,404 | 7/1962 | Péras ............................ 188/317 X |
| 3,447,644 | 6/1969 | Duckett ........................ 188/288 |
| 3,605,801 | 9/1971 | De Carbon .................... 188/317 X |
| 3,756,357 | 9/1973 | Graff et al. ................... 188/317 X |

FOREIGN PATENT DOCUMENTS

| 490,529 | 2/1954 | Italy .................................. 137/493.1 |
| 705,301 | 7/1952 | United Kingdom ................ 188/282 |
| 909,798 | 11/1962 | United Kingdom ................ 188/282 |

Primary Examiner—Trygve M. Blix
Assistant Examiner—Douglas C. Butler
Attorney, Agent, or Firm—Watson, Cole, Grindle & Watson

[57] ABSTRACT

A telescopic hydraulic shock absorber in which a valve for controlling downward flow through the piston is formed by a spring disc valve sealing against a seat on the underside of the piston, and a valve for controlling upward flow through the piston is formed by a spring disc valve located between the piston and the first-mentioned disc valve. Apertures are formed in the first-mentioned disc valve to permit the upward flow, and the second disc valve seals these apertures when closed. A single set of passages through the piston is provided to accommodate both upward and downward flows.

3 Claims, 5 Drawing Figures

HYDRAULIC SHOCK ABSORBER

BACKGROUND OF THE INVENTION

This invention relates to hydraulic shock absorbers of the kind comprising a piston slidable in a cylinder, the piston having valves which permit flow between opposite sides of the piston while imposing a pressure drop on such flow to produce the damping effect.

In many previously known designs of shock absorbers of this kind, such as that shown in my U.S. Pat. No. 3,447,644, issued June 3, 1969, and entitled "Displacement Conscious Telescopic Shock Absorber," the valves which control flow in the two directions are arranged on opposite sides of the piston, with the valve seats both being formed by part of the piston. With this arrangement, it is necessary to provide two sets of flow passages through the piston; flow in one direction through the piston passes through one set of passages, while flow in the other direction passes through the other set. The drilling of these holes tends to increase the cost of manufacturing the piston. In addition, with many of the previous designs of shock absorber, the passages are arranged at an angle to the axis of the piston; this complicates the drilling process, and also makes it difficult to use alternative methods of manufacture such as sintering.

It is an object of the present invention to provide a shock absorber in which the piston needs only a single set of flow passages.

It is a further object of the present invention to provide a shock absorber in which the flow passages in the piston are arranged parallel to the piston axis.

It is a further object of the present invention to provide a shock absorber in which the valve arrangement allows a small flow in one direction with practically no pressure drop.

It is a further object of the invention to provide a shock absorber in which the valve arrangement consists of a single pack of valve discs attached to the piston.

SUMMARY OF THE PRESENT INVENTION

According to the present invention, a hydraulic shock absorber comprising a piston slidable in a cylinder and having an annular valve seat on one side and having at least one flow passage providing communication between the area within the annular valve seat and the other side of the piston, a first valve which consists of at least one annular valve disc of resilient sheet material arranged to cooperate with the annular valve seat to control flow through the flow passage to the one side of the piston from the other side of the piston, and a second valve which is arranged to control flow from the one side of the piston to the other side of the piston, incorporates the improvement comprising: providing in the annular valve disc forming the first valve at least one flow aperture; and positioning the second valve between the piston and the annular valve disc to seat on the annular valve disc around the flow aperture or apertures, whereby flow from the one side of the piston to the other side of the piston also passes through the flow passage or passages in the piston.

Other features of the invention will become clear from the following description, taken in conjunction with the accompanying drawings, which represent a two-tube shock absorber, although the invention can be applied to both monotube and multi-tube shock absorbers.

DETAILED DESCRIPTION OF PREFERRED EMBODIMENTS

Figure 1:
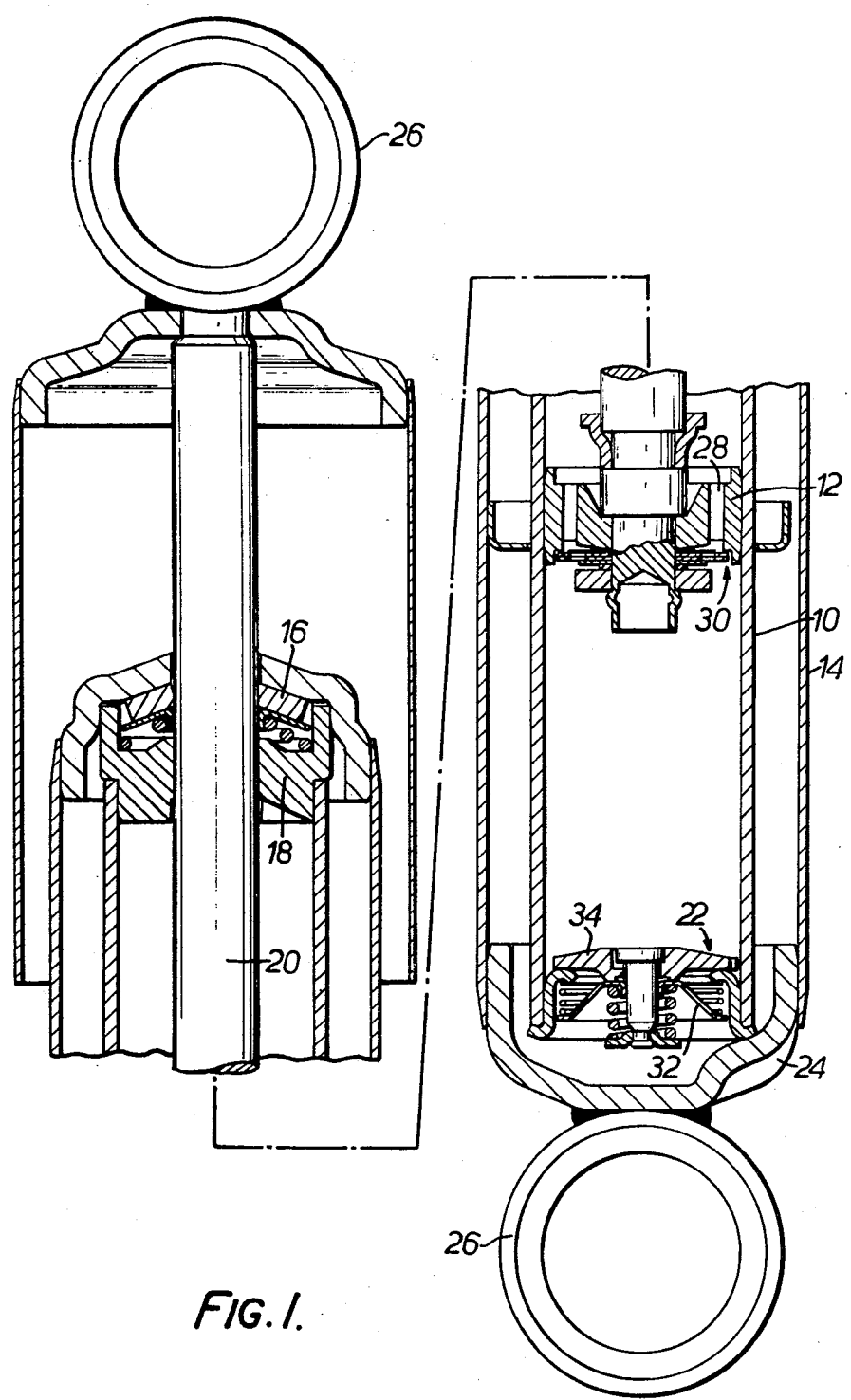
FIG. 1 is a longitudinal section of the shock absorber according to the present invention.

Referring to first to FIG. 1 of the drawings, the illustrated shock absorber has an inner working cylinder 10 in which a working piston 12 is slidable, and an outer cylinder 14 which is coaxial with the inner cylinder 10 and forms, with the inner cylinder, and annular reservior. The top ends of the cylinders 10 and are 14 are closed, and maintained in coaxial relationship by a seal assembly 16 and a piston rod guide 18, through which is guided a piston rod 20 which carries the working piston 12 at its lower end. The bottom end of the inner cylinder 10 is fitted with a base valve assembly 22. The bottom end of the outer cylinder 14 is closed by a base cap 24, against the inside of which the base valve assembly 22 abuts to maintain the inner cylinder coaxial with the outer cylinder.

The base cap 24 and the top end of the piston rod 20 are provided with eyes 26 by which the shock absorber is connected to the parts between which vibration is to be damped, such as the body and a road wheel respectively of a motor vehicle. The working piston 12 is provided with passages 28 which extend from one side of the piston to the other, but are normally closed by a valve assembly 30. The inner working cylinder 10 and part of the annular reservoir are filled with oil; the rest of the annular reservoir contains air at about atmospheric pressure.

In operation, downward movement of the piston 12 in the cylinder 10 results in a flow of oil from the space below the piston to the space above the piston through the valve assembly in the piston; this valve assembly is so arranged that flow in this direction is only slightly restricted. There is also a flow of oil from the working cylinder 10 to the annular reservoir, corresponding to the displacement of the piston rod 20. This flow passes through a spring-loaded valve 32 forming part of the base valve assembly 22. The pressure in the working cylinder 10 must rise considerably before the valve 32 will open, so that the downward movement of the piston 12 is opposed by a damping force.

When the piston 12 moves upwards in the cylinder 10, oil flows from the space above the piston through the valve assembly in the piston to the space below the piston. The pressure in the space above the piston must rise considerably before the valve assembly will open to allow flow in this direction, so that the movement of the piston is again opposed by a damping force. There will also be a flow of oil from the annular reservoir to the space below the piston. This flow passes through a further spring-loaded valve 34 forming part of the base valve assembly 22; the valve 34 is only lightly spring-loaded, so that the flow is only slightly restricted.

The construction of the piston 12 and the valve assembly 30 will now be described in greater detail, especially referring to FIG. 2.

The passages 28 through the piston are four in number, and are equally spaced around the piston rod 20. These passages open at their lower ends into an annular recess 36 in the lower face of the piston 12. The piston is also formed with a central bore 38 into which a reduced diameter end portion 68 of the piston rod fits, with a shoulder 72 on the piston rod abutting against an upward-facing surface on the piston. The reduced diameter portion 68 projects on the underside of the piston, and serves to centre a pack of annular spring steel discs forming the valve assembly 30. The spring discs are held against the lower face of the piston by a backing washer 44 placed over the projecting part of the piston rod. To retain the piston on the piston rod, and also to keep the spring discs and the backing washer 44 in position against the lower face of the piston, the lower end of the piston rod 20 is spread after the backing washer has been put in position. The spreading operation is facilitated by a blind hole 70 which is drilled axially in the end of the piston rod, so that the portion of the rod which is to be spread is tubular rather than solid.

Figure 2:
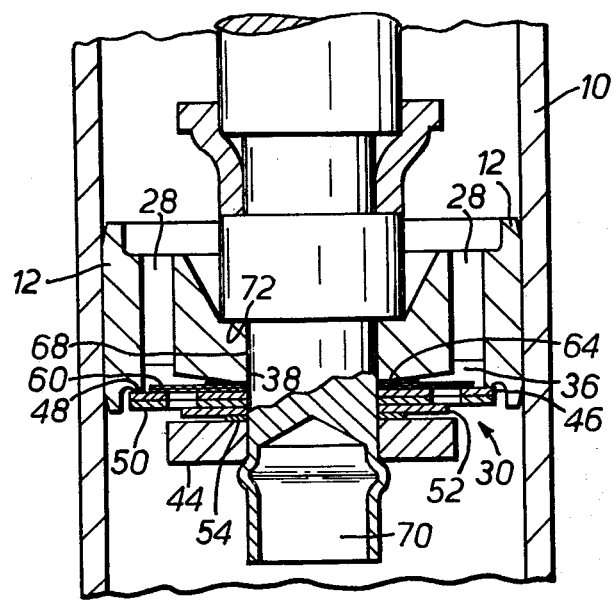
FIG. 2 is a view corresponding to part of FIG. 1 to an enlarged scale.

The annular recess 36 in the lower face of the piston 12 is normally closed by the third spring disc in the pack, counting from the top; this disc is indicated by the reference number 46, and, as can be seen in FIG. 2, its diameter is large enough for it to engage a lip 48 which defines the outer circumference of the recess 36. Whenever the pressure above the piston 12 is greater than that below, this pressure difference tends to deflect the disc 46 downwards at its outer edge, so that oil can flow from the space above the piston, through the passages 28, and between the lip 48 and the upper surface of the disc 46 to the space below the piston. The fourth and fifth discs in the pack (shown at 50 and 52 respectively) serve to stiffen the disc 46, so that a considerable pressure difference is needed to open the valve assembly for downward flow; as can be seen, the disc 50 has the same diameter as the disc 46, while the disc 52 is somewhat smaller. The bottom disc of the pack, shown at 54, simply acts as a spacer to ensure that deflection of the discs 46, 50 and 52 is not impeded by the backing washer 44.

Figure 3:
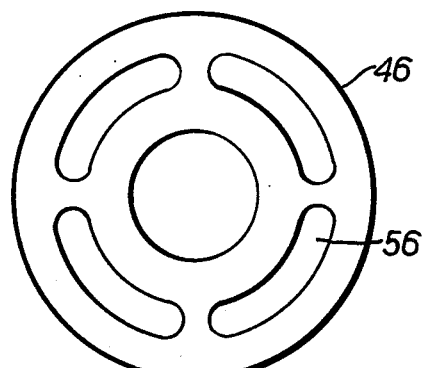
FIGS. 3 and 4 are plan views of two discs forming part of the valve assembly.
Figure 4:
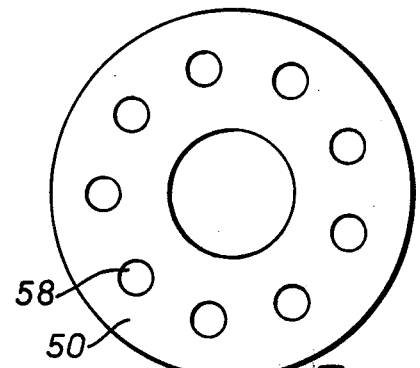

As can be seen from FIGS. 3 and 4, the spring discs 46 and 50 have various apertures 56, 58 spaced around their central openings. Flow through these apertures is normally prevented by the second disc in the pack (counting from the top), which is shown at 60. The diameter of this disc is less than the outer diameter of the recess 36, so that the disc is free to deflect upwards within the recess. Whenever the pressure below the piston is greater than that above, the pressure difference acts, through the apertures 56 and 58, on the underside of the disc 60 and tends to deflect it upwards at its outer edge, so that oil can flow from the space below the piston, through the apertures 56 and 58, between the discs 46 and 60, and through the passages 28 to the space above the piston. The first disc in the pack, shown at 64, serves both as a spacer and to stiffen the disc 60 slightly; even so, the pressure difference needed to deflect the disc 60 is very much less than that needed to deflect the disc 46, because the disc 60 is made of much thinner material than the disc 46.

The apertures 56 in the disc 46 form nearly a complete annular opening (in other words, the flow apertures together subtend approximately 360° at or around the center of the disc 46); the annulus is interrupted at four equally-spaced positions, as can be seen in FIG. 3. This arrangement ensures that nearly the whole of the circumferential opening which appears when the disc 60 lifts is available for fluid flow. The apertures 58 in the disc 50 consist of a ring of nine equally-spaced circular holes, as can be seen in FIG. 4. There is no need to ensure that the disc 46 and 50 are assembled and retained in a particular relative angular position, because with this arrangement of apertures, the cross-sectional area available for fluid flow through the apertures 58 is always equal, or practically equal, to the cross-sectional area provided by eight of the nine holes. In certain relative angular positions of the discs, one of the holes is completely blocked, while the other eight are practically unobstructed; in other positions, two of the holes are partially blocked, but the unblocked areas of these two holes are together approximately equivalent to an unobstructed hole.

The disc 52 overlaps the holes in the disc 50, reducing their effective cross-sectional area by about half. The same design of disc 50 can therefore be used in different designs of shock absorbers, the flow cross-sectional area being selected to suit the design by selecting the diameter of the disc 52.

Figure 5:
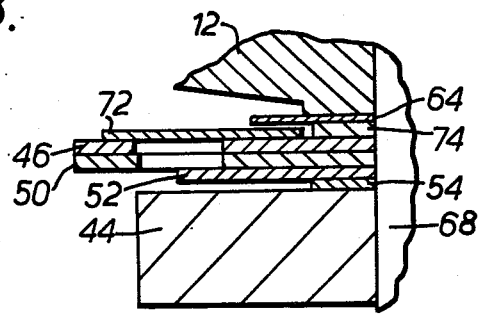
FIG. 5 is a view, corresponding to part of FIG. 2 on an enlarged scale, of part of a modified shock absorber.

In some designs of shock absorber, the valve assembly 30 may be required to permit small flows of oil from the space below the piston to the space above the piston with only a very small pressure difference between the two spaces. FIG. 5 shows a modification of the valve assembly 30 which is particularly suitable for use in such designs.

The valve assembly includes discs 46, 50, 52, 54 and 64 which are identical to those described above. However, the second disc 60 is replaced by a floating annular disc 72 and a spacer 74. The spacer 74 has an outside diameter slightly less than the diameter of the central hole of the disc 72, so that it serves to centre the disc 72, and thickness of the spacer 74 is greater than the thickness of the disc 72, so that the disc is free to float axially over a small range. Thus a very small excess pressure on the lower side of the piston will lift the disc 72, without any elastic deformation of the disc, and a small flow of oil will be permitted. For larger flows of oil, the disc will deflect elastically in the same way as the disc 60 of the shock absorber of FIGS. 1 to 4.

What I claim as my invention and desire to secure by Letters Patent is:

1. In a hydraulic shock absorber comprising, a piston slideable in a cylinder and having an annular valve seat on one side and having at least one flow passage providing communication between the area within the said annular valve seat and the other side of the said piston, a first valve disc of resilient sheet material which is arranged to cooperate with the said annular valve seat to control flow through the said flow passage to said one side of the said piston from the other side of the said piston, and which has flow apertures extending therethrough, and a second valve disc of resilient sheet material which is positioned between a portion of the said piston and the said first valve disc and is arranged to cooperate with the surface of the first valve disc around said flow apertures to control flow from said one side of the said piston through the said flow apertures and the said flow passage to the other side of the said piston, the improvement comprising: forming the said flow apertures in said first valve disc each in the shape of an elongate arcuate slot whose center of curvature lies generally at the center of the first valve disc, with said flow apertures together subtending approximately 360° at the center of said first valve disc, whereby fluid flow through said flow apertures will flow radially outwardly between said first and second valve discs around substantially the whole circumference of said valve discs, said shock absorber further including a third valve disc of resilient sheet material supporting said first valve disc on the side thereof opposite to the side facing said valve seat, the third valve disc having flow apertures to accommodate fluid flow from said one side of said piston to said other side thereof, and said flow apertures of said first and third valve discs being so arranged that the total effective cross-sectional area of the flow path through said flow apertures is substantially independent of the relative angular position of said first and third valve discs.

2. A shock absorber according to claim 1, in which said second valve disc is constructed so as to move freely away from the said first valve disc over the initial part of its opening movement.

3. A shock absorber according to claim 1, further including at least one further valve disc of resilient sheet material supporting said second valve disc on the side thereof opposite from the side facing said first valve disc.

* * * * *